US006535473B1

(12) United States Patent
Swanson et al.

(10) Patent No.: US 6,535,473 B1
(45) Date of Patent: Mar. 18, 2003

(54) OPTICAL HEADS MANUFACTURABLE IN WAFER FORM

(75) Inventors: Lori G. Swanson, Bloomington, MN (US); Christina L. Hutchinson, Apple Valley, MN (US); Daniel E. Glumac, Little Canada, MN (US); Edward C. Gage, Apple Valley, MN (US); John F. Heanue, San Jose, CA (US)

(73) Assignee: Seagate Technology LLC, Scotts Valley, CA (US)

(*) Notice: Subject to any disclaimer, the term of this patent is extended or adjusted under 35 U.S.C. 154(b) by 0 days.

(21) Appl. No.: 09/546,100

(22) Filed: Apr. 10, 2000

Related U.S. Application Data

(60) Provisional application No. 60/129,051, filed on Apr. 13, 1999.

(51) Int. Cl.[7] .................................................. G11B 7/00
(52) U.S. Cl. ............................. 369/112.01; 369/44.23; 369/112.24
(58) Field of Search .................................. 369/119, 112, 369/13, 121, 44.19, 275.4, 275.1, 112.24, 44.23, 44.121, 112.27, 112.29, 112.01, 112.07, 112.06, 109.02, 112.09; 360/103, 77.03, 113; 356/237.1, 239, 301; 359/19, 368, 350, 356

(56) References Cited

U.S. PATENT DOCUMENTS

| | | | | |
|---|---|---|---|---|
| 5,208,648 A | * | 5/1993 | Batchelder et al. | 359/350 |
| 5,602,819 A | * | 2/1997 | Inagaki et al. | 369/109.02 |
| 5,687,155 A | * | 11/1997 | Fukakusa et al. | 369/112.06 |
| 5,978,139 A | * | 11/1999 | Hatakoshi et al. | 369/112.07 |
| 6,009,064 A | * | 12/1999 | Hajjar | 369/112.24 |
| 6,044,056 A | * | 3/2000 | Wilde et al. | 369/119 |
| 6,324,149 B1 | * | 11/2001 | Mifune et al. | 369/112.01 |

* cited by examiner

*Primary Examiner*—William Korzuch
*Assistant Examiner*—Kim-Kwok Chu
(74) *Attorney, Agent, or Firm*—Westman, Champlin & Kelly

(57) ABSTRACT

Wafer-scale integration in gallium phosphide (GaP) is used to overcome the assembly difficulties of current optical heads, resulting in significantly improvements in optical performance as well as reduced cost.

18 Claims, 11 Drawing Sheets

| | |
|---|---|
| NA | 0.83 |
| Spot Size (scaler estimate) | 0.46 μm |
| Specification for first surface* | $R=0.257,\ k=-0.2016,\ A1=-1.238,\ A2=15.50$ |
| Specification for second surface* | Flat |
| Center thickness | 0.430+/−0.005 mm |
| Clear aperture | 0.215 mm |
| Image field-of-view | +/−4.7 μm |

* The optical surfaces are specified by the following equation:

$$sag = \frac{r^2/R}{1+\sqrt{1-(1+k)(r/R)^2}} + A_1 r^4 + A_2 r^6,$$

where $r$ is the distance from the optical axis, $R$ is the radius of curvature, $k$ is the conic constant and $A_1$ and $A_2$ are aspheric coefficients.

Lens units are mm.

*Fig. 5*

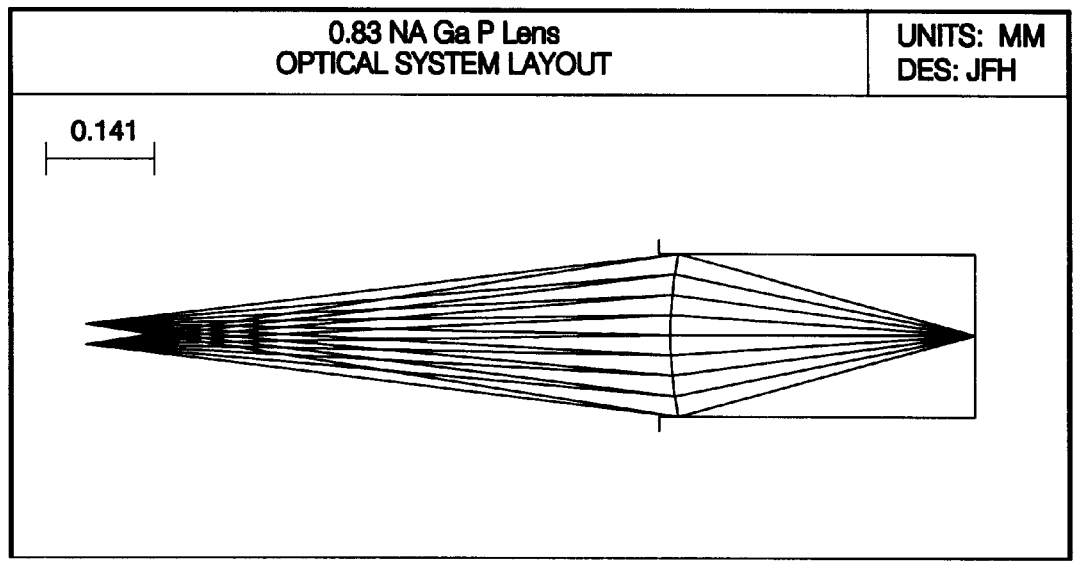

*Fig. 6*

| | |
|---|---|
| NA | 1.30 |
| Spot Size (scaler estimate) | 0.29 μm |
| Specification for first element, first surface* | $R=1.287$, $k=-3.468$, $A1=0$, $A2=8.752$ |
| Specification for first element, second surface* | Flat |
| Specification for second element, first surface* | $R=0.207$, $k=-0.0154$, $A1=0$, $A2=-33.54$ |
| Specification for second element, second surface* | Flat |
| Center thickness, first element | 0.285 +/-0.030 mm |
| Center thickness, second element | 0.280 +/-0.005 mm |
| Element spacing | 0.020 +/-0.020 mm |
| Lateral alignment tolerance | +/-0.018 mm |
| Clear aperture | 0.215 mm |
| Image field-of-view | +/-5.0 μm |

\* The optical surfaces are specified by the following equation:

$$sag = \frac{r^2/R}{1 + \sqrt{1-(1+k)(r/R)^2}} + A_1 r^4 + A_2 r^6,$$

where $r$ is the distance from the optical axis, $R$ is the radius of curvature, $k$ is the conic constant and $A_1$ and $A_2$ are aspheric coefficients. Lens units are mm.

Fig. 7

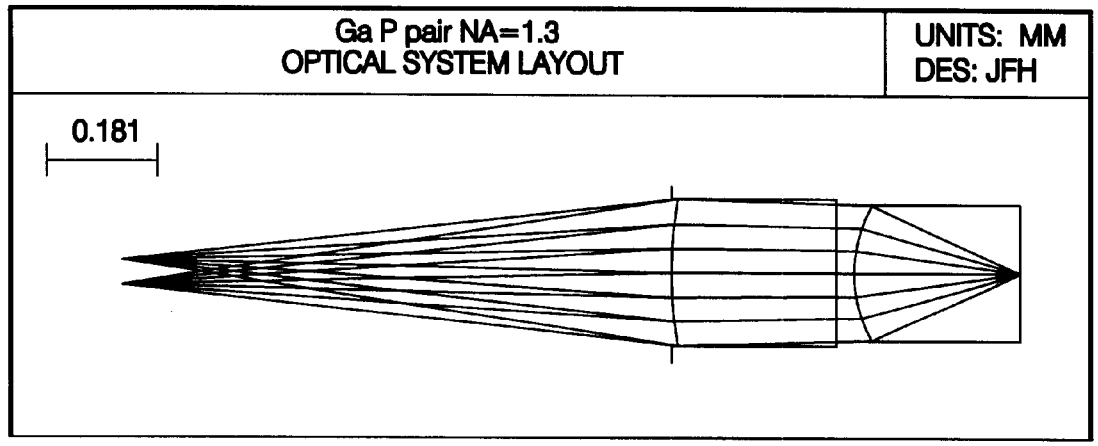

Fig. 8

250
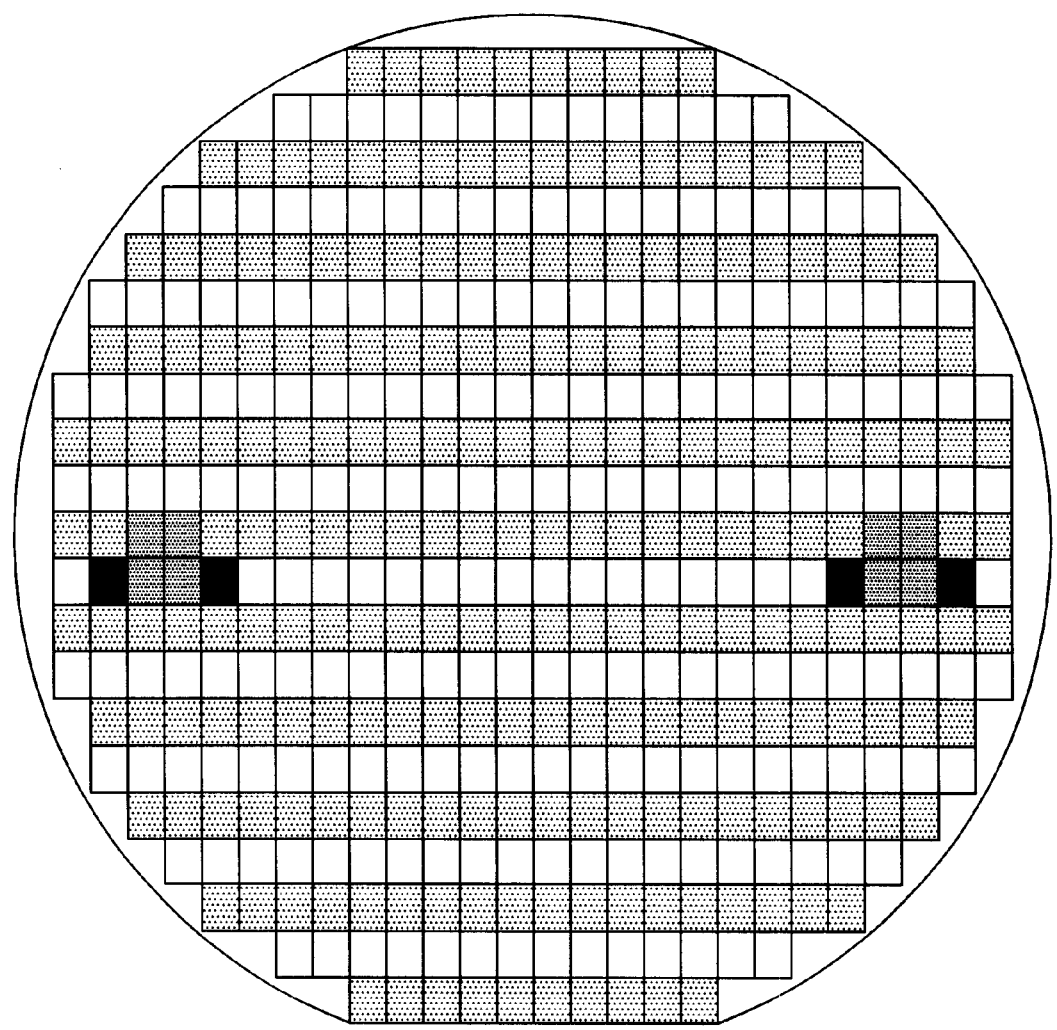
 Down facing sliders
 Up facing sliders
 Spaces reserved for Alignment marks
 Spaces reserved for Alignment marks & Mask part numbers
GaP wafer layout
*Fig. 10*

Step 1. Aquire a wafer full of lenses. (Wafer A) Deposit Glass Frit.
Step 2. On a second wafer (Wafer B) etch the fiber, glue and lens slots.
Step 3. Bond the two wafers together.
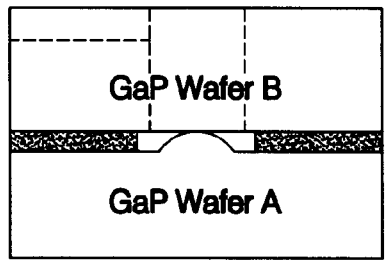
Step 4. Etch ABS and coil recess.
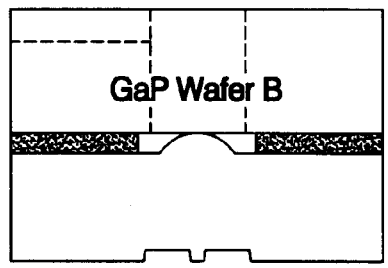
Step 5. Build Coil Stack. Turn wafer over and plate bond pads.
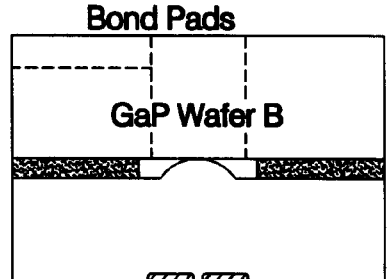
Step 6. Slice & cut mirror angle.
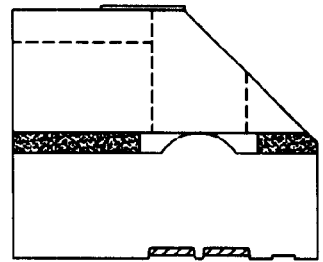
Step 7. Shadow mask to connect leads to bond pads.
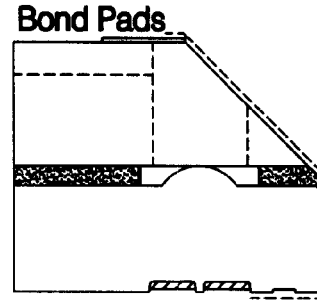
Finished Slider
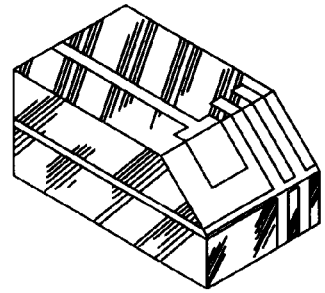
Fig. 11

US 6,535,473 B1

OPTICAL HEADS MANUFACTURABLE IN WAFER FORM

RELATED APPLICATIONS

This application is related to and claims priority from Provisional Application Ser. No. 60/129,051 filed Apr. 13, 1999.

FIELD OF THE INVENTION

The present invention is related to optical heads and their manufacture in wafer form.

BACKGROUND

A schematic of an embodiment of an optical head is shown in FIG. 2. The head comprises a number of discrete parts: a slider body, a movable micro-machined tracking mirror, a fiber, a magnetic writing coil, a molded glass lens, a lens holder, and possibly a quarter-wave plate. The quarter wave-plate plate may be needed when a polarization-maintaining fiber is used, but is not used when a low-birefringence fiber is used. Assembly of this head is complex due to the small size of the components and to tight alignment tolerances. The lens-to-slider and coil-attach processes are particularly time-consuming and tedious. Another disadvantage is that the lenses are molded one piece at a time, leading to high costs and difficulty in handling. Furthermore, the lens is limited to a numerical aperture (NA) less than 0.85, resulting in a maximum areal density of around 4 Gb/in$^2$ using a 660 nm laser, quad-MO media, and a conventional read channel.

What is needed is a head design that makes head assembly more efficient and that offers a path to significantly higher areal densities.

SUMMARY

The present invention includes an optical head for transferring a light from a source to a storage disk of a storage drive, comprising: a first block; a reflective element, the reflective element coupled to the first block to direct the light to the disk; a second block, the second block coupled to the first block; and a first lens, the first lens for focusing the light onto the disk; and the first lens formed of the second block. The first and/or second blocks may comprise GaP (Gallium Phosphorus). The second lens may comprise a near-field lens. The first block may comprise silicon. The second block may comprise GaP. The optical head may also comprise a third block, the third block disposed between the first and second blocks and coupled thereto. The optical head may also comprise as second lens, wherein the second lens is formed of the third block. The third block may comprise GaP. The first lens and the second lens may provide an NA of at least 1.13.

The present invention also includes a storage system comprising: a source, the source providing a light; a storage disk; a head; a first block; a reflective element, the reflective element coupled to the first block to direct the light to the storage disk; a second block, the second block coupled to the first block; and a first lens, the first lens formed of the second block, and the first lens for focusing the light onto the storage disk. The second block may comprise GaP. The first lens may comprise a near-field lens. The first and/or second blocks may comprise GaP. The first block may comprise silicon. The optical head may also comprise a third block, the third block disposed between the first and second blocks and coupled thereto. The optical head may further comprise a second lens, wherein the second lens is formed of the third block.

The present invention may also comprise a disk drive head, including: a light directing means for directing a light towards a storage medium; and a focusing means for focusing the light onto the storage means, wherein the light directing means is coupled to the focusing means.

DESCRIPTION OF THE FIGURES

FIG. 5 shows design, performance specifications, and tolerances for an exemplary embodiment of the lens of the far-field head;

FIG. 6 shows an optical ray-trace for the lens corresponding to FIG. 5;

FIG. 7 shows design, performance specifications, and tolerances of an embodiment of the lenses of the near-field head;

FIG. 8 shows an optical ray-trace for the lens corresponding to FIG. 7;

FIG. 10 shows a wafer layout for a 2-inch GaP wafer.

FIG. 11 shows a pictorial diagram of the far field head fabrication process.

DESCRIPTION OF THE INVENTION

Figure 1:
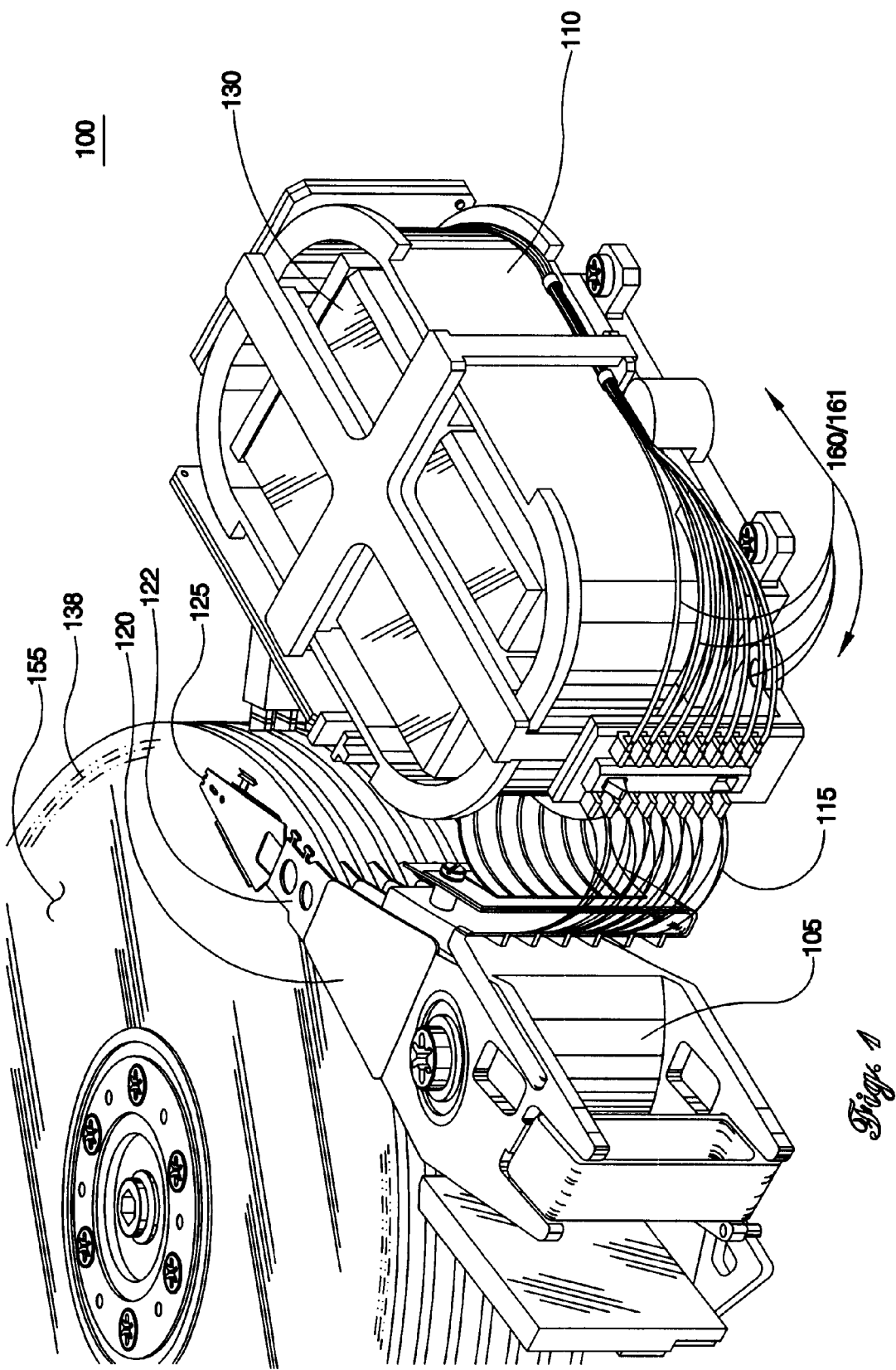
FIG. 1 shows a perspective view of a multi-disk optical drive 100.

Referring in detail to the drawings wherein similar parts are identified by like reference numbers, there is seen in FIG. 1 a perspective view of a multi-disk optical drive 100. In this view, a head stack assembly 105 comprises individual heads 125, each of which is coupled to individual arms 120 through respective suspensions 122. In the preferred embodiment, the heads 125 comprise flying magneto-optical (MO) heads. The MO heads 125 comprise air bearing surfaces of a type well known in the Winchester disc drive arts. The air bearing surfaces interact to maintain the MO heads above respective rotating disks 155. While the present invention is described with reference to flying MO heads, it is understood that non flying MO heads used in the disk drive industry are also with the scope of use with the present invention. The head 125 may also comprise an optical head wherein magnetic elements are not utilized (not shown). FIG. 1 further illustrates a group of individual optical fibers 115, which are all coupled to an optical switch 130 at one end and to individual ones of the MO heads 125 at an opposite end. The optical switch 130 selectively directs a light 160 from a source (not shown) to a particular one of the individual optical fibers 115. The optical fibers 115 function to route the light 160 between the optical switch 130 and a particular MO head 125.

Figure 2:
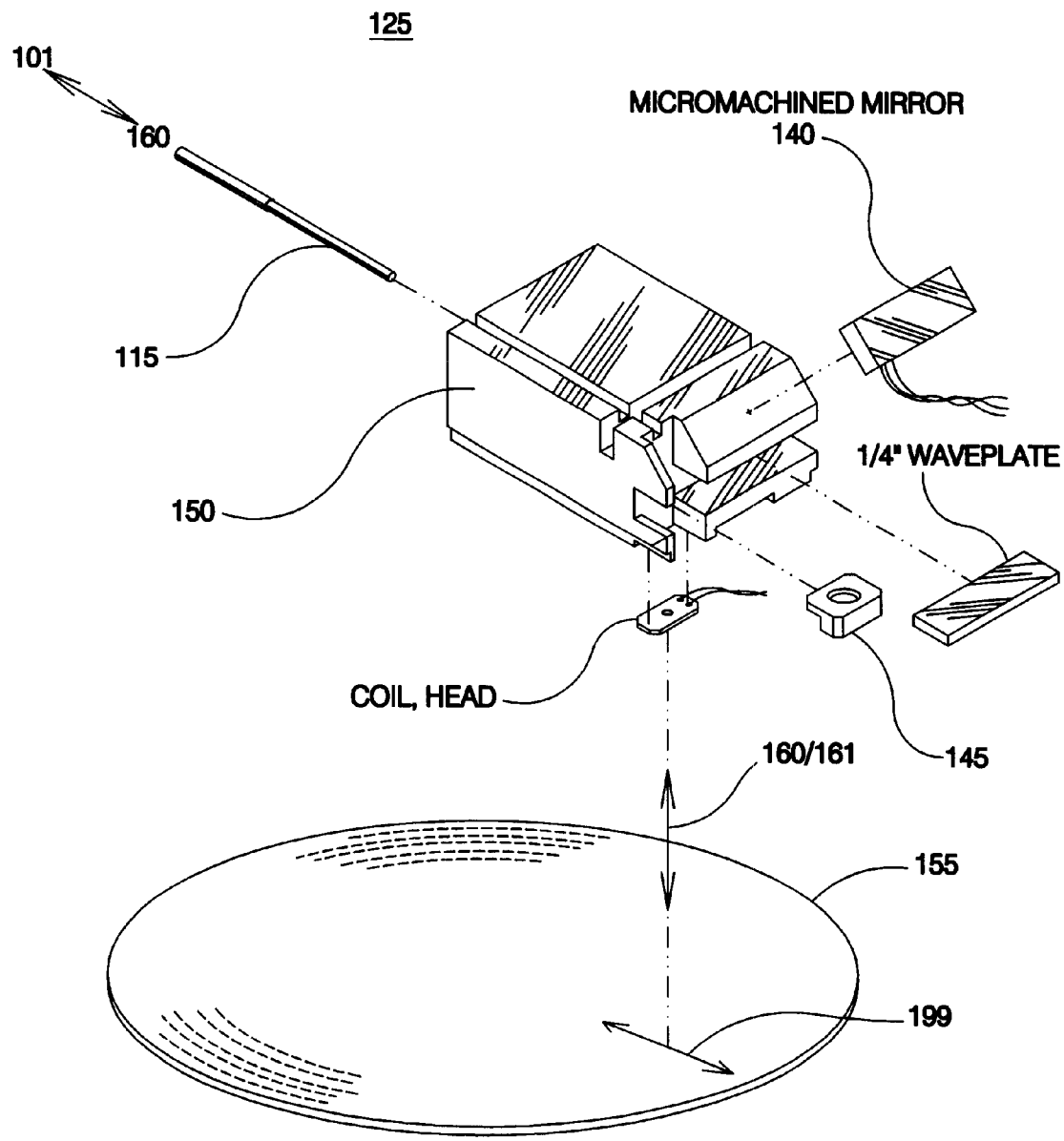
FIG. 2 shows an exploded view of a MO head.

Referring now to FIG. 2 and preceding Figures as needed, there is an exploded view of a previous embodiment of a MO head 125 in which is shown attached to a body 150, the optical fiber 115, a steerable micro-machined mirror 140, and a focusing lens 145. FIG. 2 also shows a path of the light 160 as it travels along the optical fiber 115. The light 160 is directed and reflected by a steerable micro-machined mirror 140 in a radial direction 199 of the disk 155. During normal drive operation, the light 160 is focused by the lens 145 onto a surface of a particular disk 155, and reflected light 161 is returned from the disk 155 to the optical switch 130 for processing by optics and electronics.

Figure 3:
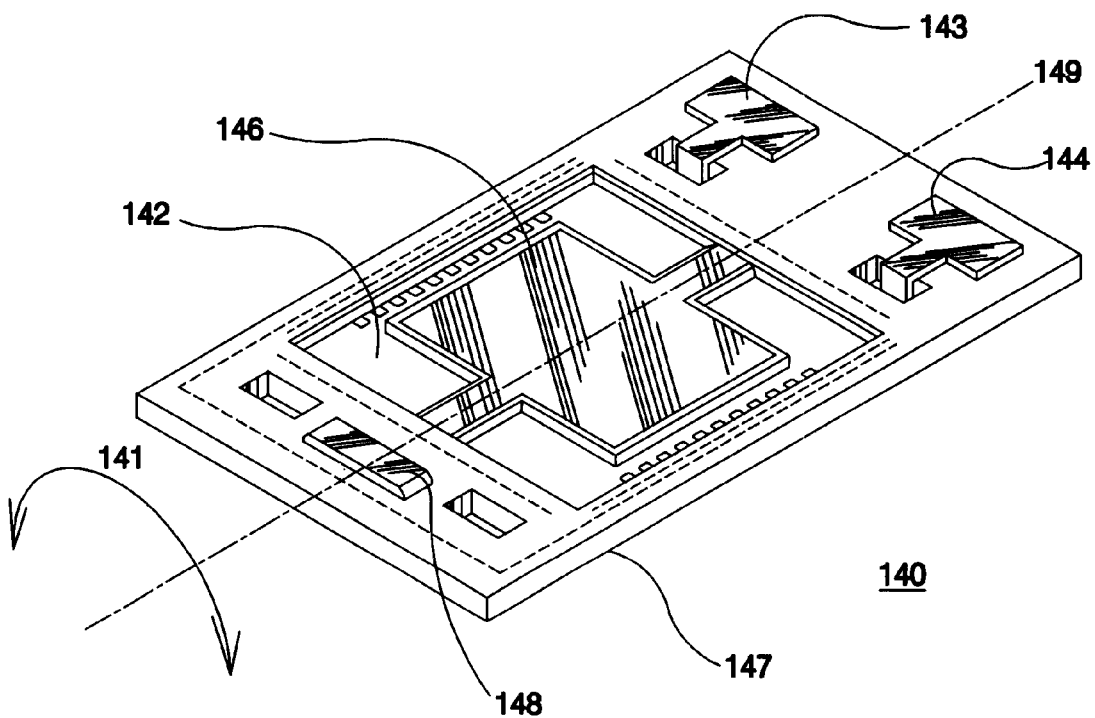
FIG. 3 shows a steerable micro-machined mirror.

Referring now to FIG. 3 and preceding Figures as needed, the steerable micro-machined mirror 140 of FIG. 2 is seen to include a moveable portion 146 attached to a body 147 by beams 142. Bond pads 143 and 144 are connected electrically to drive-electrodes (not shown) located underneath and separated from the moveable portion 146 by an air gap. When a voltage is applied to pad 143 or 144 relative to a ground pad 148, an electrostatic force is applied to the moveable portion 146 to cause it to torsionally vector about the beams 142 by a desired angle 141 about axis 149.

Figure 4A:
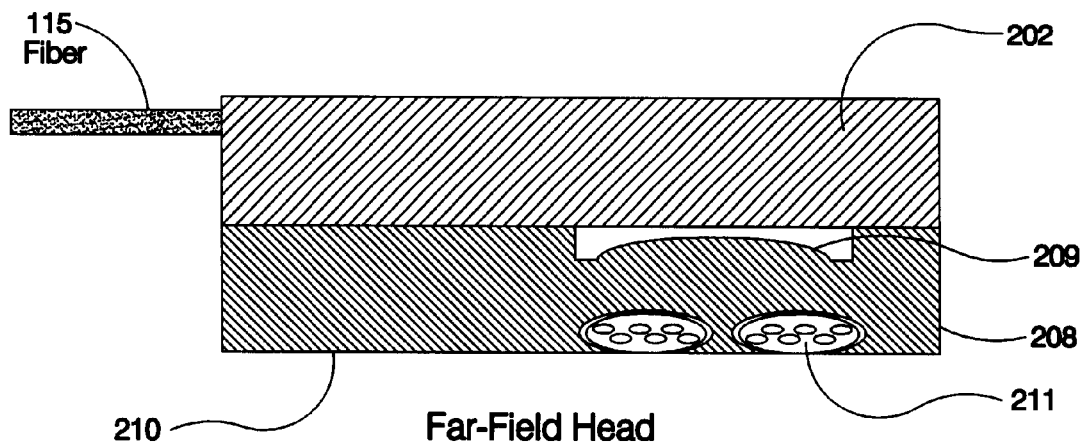
FIG. 4a shows a far-field MO head embodiment of the present invention.

Referring now to FIG. 4a and preceding Figures as needed, there is seen a far-field MO head embodiment of the present invention. In FIG. 4a, the MO head 125 of FIGS. 1 and 2 is replaced by a far-field head 201 design of the present invention. The far-field head 201 has an advantage that its fly height can be on the order of 10–15 uin. The far-field head allows use of preformatted plastic disks 155. The head designs of the present invention may comprise parts made from gallium phosphide (GaP) wafers. GaP is a convenient material to work with because it has a high refractive index and because it can be etched to form various lens designs. By using GAP, the manufacture of the MO head 201 may be simplified. Use of GAP also provides a design path to significantly higher areal densities.

In one embodiment of the far-field head 201, the head comprises a bottom block 208 made from a piece of a GaP wafer, with a lens 209 etched into the block's top surface and an air bearing 210 etched into its bottom surface. The lens 209 may comprise a plano-convex lens. The lens 209 may be designed such that a bottom of the lens is coplanar with the air-bearing surface. Anti-reflection coatings are preferred on the lens surfaces. A top block 202 comprises a silicon wafer processed to include an integrated tilt-up micro-machined tracking mirror 203 and an etched channel 205 for receiving the optical fiber 115. The top block 202 can be designed to also include etched slots 206 for holding a quarter-wave plate and/or a wave-plate 207 that may be used to compensate for phase shift introduced by optical components. The far-field head design 201 may be further fabricated to provide a magnetic coil 211 directly below the lens 209 and inside a cavity of the bottom block 208. Fabrication of the coil 211 may utilize thin film patterning and cured photoresist insulators. The coil is 211 designed so that a high magnetic field is generated near the focal point of the light 160 that passes through the lens 209. Bond pads 212 for the coil 209 may be patterned directly on the top. block 202 for accessibility during wire bonding. Connections from the bond pads 212 to the coil 209 can be made by etching or laser drilling vias through the head 201, and by using an electroless plating technique to establish the current path.

Referring now to FIG. 5 and preceding Figures as needed, design, performance specifications, and tolerances for an exemplary embodiment of the lens 209 of the far-field head 201 are given in table format. In this embodiment, the lens 209 provides a numerical aperture (NA) of approximately 0.83 and a corresponding spot size of 0.46 um for an areal density target of about 4 Gb/in$^2$; however, the far-field embodiment should be extendable to an NA of at least 0.9.

Referring now to FIG. 6 and preceding Figures as needed, an optical ray-trace for the lens 209 corresponding to the specifications of the table of FIG. 5 is shown.

Figure 4B:
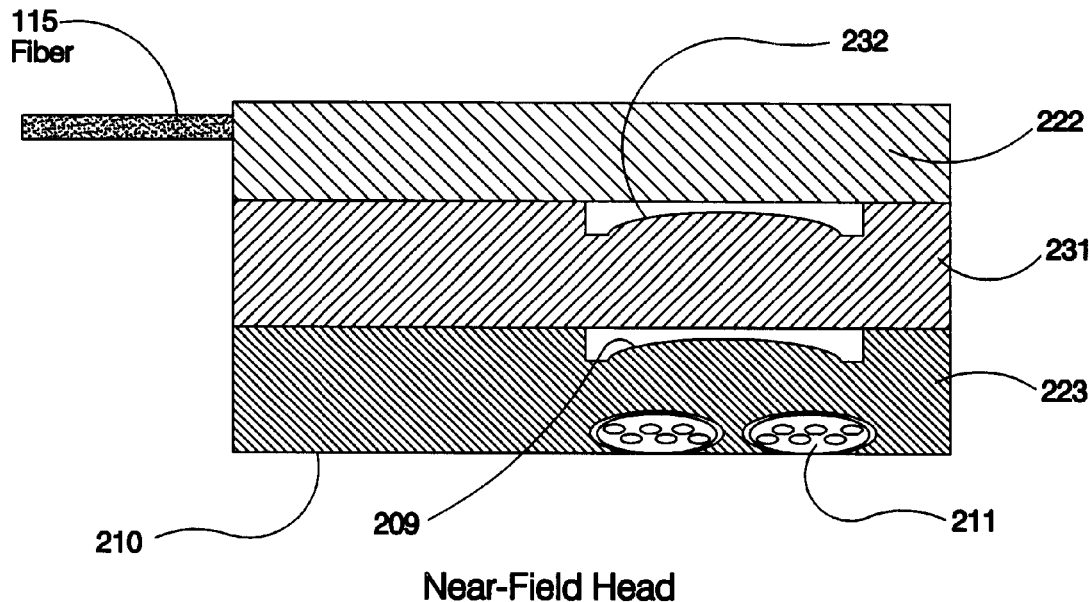
FIG. 4b shows a near-field MO head embodiment of the present invention.

Referring now to FIG. 4b and preceding Figures as needed there is seen a near-field MO head embodiment of the present invention. In the near-field embodiment of the present invention, the head 125 of FIGS. 1 and 2 is replaced by a near-field head 221 that comprises top 222 and bottom 223 blocks that are similar in design to the far-field head 201. The near field head 201 has an advantage that its fly height can be on the order of less than 5 uin. The reduced fly height distance over that of the far field head 101 enables focusing of the light 160 with a smaller spot size. The head 221 also comprises a third block 231 that comprises a lens 232. The lens 232 is used in combination with an embodiment of the lens 209 to provide the head 221 with a high numerical aperture (NA), while at the same time achieving a wide enough image field-of-view.

Referring now to FIG. 7 and preceding Figures as needed, the design, performance specifications, and tolerances of an embodiment of the lenses 209/231 of the near-field head 221 are given in table format. The lenses 209/231 preferably exhibit an effective NA of approximately 1.3 and a spot size of about 0.29 um for an areal density target of about 11 Gb/in$^2$. The two-element near-field concept should be extendable up to a NA of about 2.5.

Referring now to FIG. 8 and preceding Figures as needed, an optical ray-trace for the lens 209/231 combination corresponding to the specs of FIG. 7 is shown.

Figure 9:
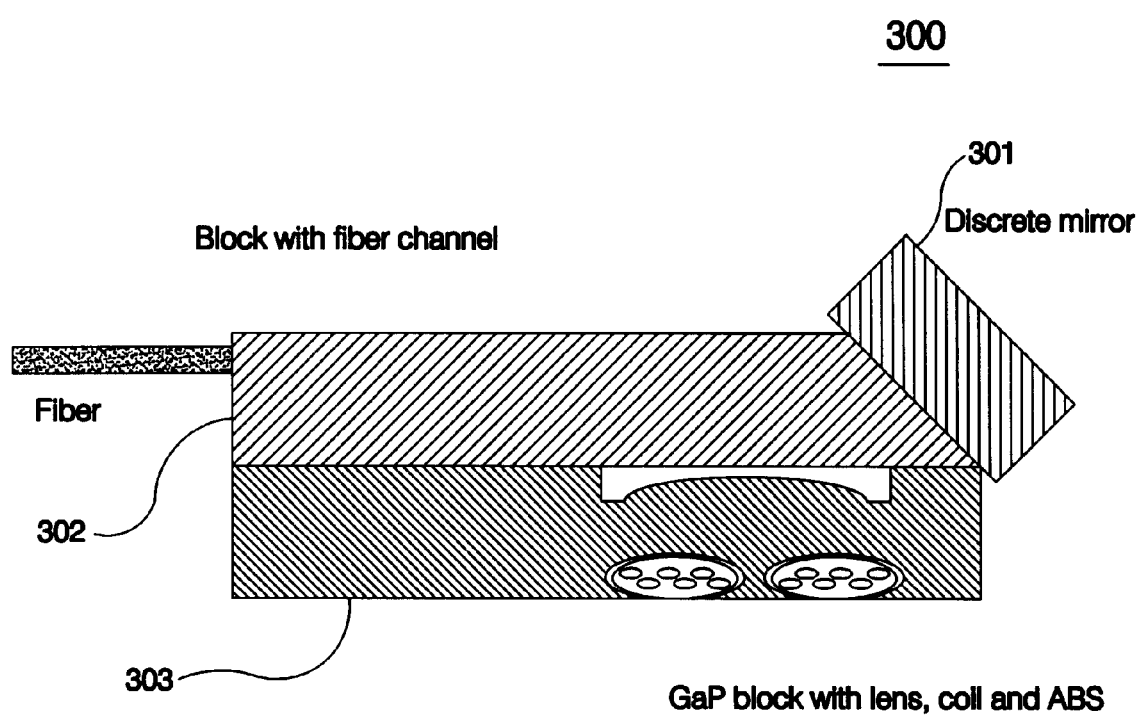
FIG. 9 shows an alternative embodiment of a head of the present invention.

Referring now to FIG. 9 and preceding Figures as needed, an alternative embodiment of a head of the present invention is shown. One advantage of the previous embodiments of the present invention discussed above is that the air bearing surface (ABS), lens, and coil are integrated together in one piece and may be are created at the wafer level. In other embodiments it may be advantageous to make the other parts in discrete form for economic reasons or until suitable wafer-scale processes can be developed. In the embodiment of FIG. 9, a micro-machined mirror 301 comprises a discrete component that may be placed on either at the row-bar or individual head level during the manufacturing process of making a head 300. The mirror 301 may be attached to a top block 302 by an attach process that could be automated using pick-and-place technology. The top block 302 could be made from silicon, GaP, AlTiC or other suitable material. A GaP top block 302 would minimize stresses due to thermal expansion mismatch during a wafer bond process to a GAP lower block 303. The upper and lower blocks 302/303 could be assembled at wafer, row-bar, or individual head level.

Referring now to FIG. 10 and preceding Figures as needed, a wafer layout for a 2-inch GAP wafer is shown. The present invention identifies that for either of the heads 201/221, if a discrete micro-machined mirror 301 is used, the remaining constituent parts may be fabricated in a set of two GAP wafers 250. The wafers 250 may be aligned and bonded together and then the bonded assembly may be diced to yield individual heads 201/221. One possible method of bonding the wafers 250 in the fabrication process is glass frit bonding, wherein, a glass in a paste form is applied to a first GA wafer 250, which may be lithographed using a screen-printing process. Next, the GAP wafer 250 may be heat-treated (glazed) to burn out organic components of the paste. A second GAP wafer 250 may be placed in contact with the glass side of the first wafer. Next, heat and pressure are applied to the wafer stack, causing the glass paste to reflow and adhere to the two wafers. The glass frit approach can be used for bonding wafers of the same materials or for bonding dissimilar materials.

The wafers 255 may also be bonded in a direct wafer fusion bond. Fusion bonding involves placing two like materials in contact and applying heat and pressure to cause their surfaces to chemically react or fuse together. This method has been employed to bond silicon to silicon and silicon to silicon dioxide and may be applicable to GaP-to-GaP bonding.

A third possibility is an anodic bond. Anodic bonding typically involves a doped ceramic (such as a sodium-ion-rich glass) and a conductive substrate (such as silicon or metal). The substrates are placed in contact using pressure. Heat (to reach the softening temperature of the glass) and an electric field are applied. The electric field causes the charged ions in the ceramic/glass to move away: from the interface of the two substrates, leaving a space charge region. This space charge region causes the second substrate to be attracted, setting a strong bond.

The possibility of using additional bonding techniques exists. Eutectic Au-Si, PECVD oxides and nitrides, and even photo-resist or adhesives may have potential as "frit" layers to attach substrates.

Referring now to FIG. 11 and preceding Figures as needed, a pictorial diagram of the far field head 101 fabrication process is shown.

Figure 12:
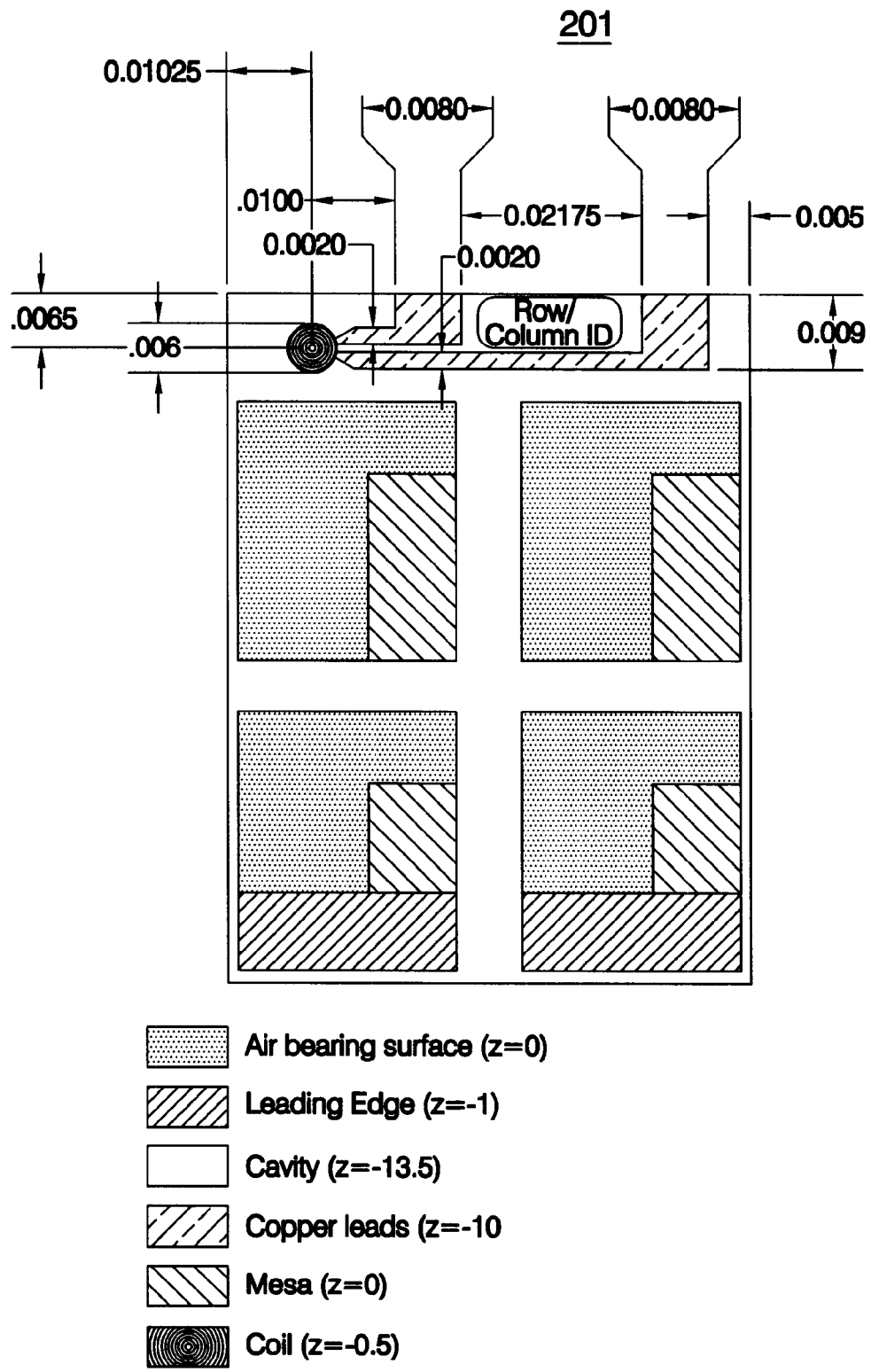
FIG. 12 shows a bearing and coil layout for the far-field head.

Referring now to FIG. 12 and preceding Figures as needed, the bearing and coil layout for the far-field head 201 is shown.

Figure 13:
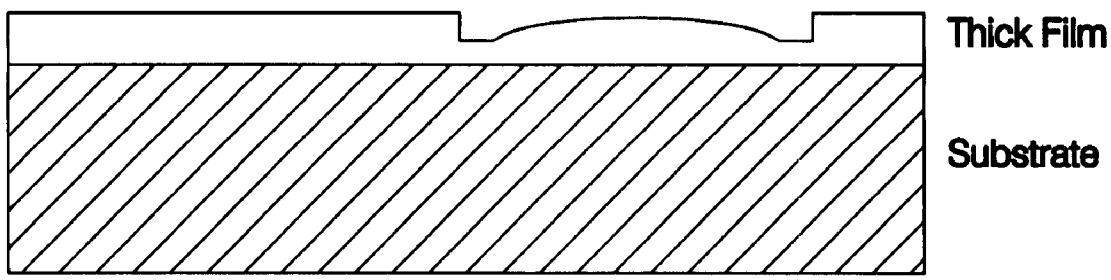
FIG. 13 shows a lens etched in a thick film deposited on a substrate made from different material.

Other features and advantages of the present invention may become apparent to a person of skill in the art who studies the present invention disclosure. For example, the optical designs presented above are only examples. Other surface shapes are possible and may be desired. For example, a diffractive surface may be useful in certain applications in place of the lens surfaces described above. There are also a number of ways to pattern the lenses in GaP. One is to deposit photo-resist, expose with a gray-scale mask, and etch. Another possibility is to deposit photo-resist, reflow the photo-resist, and etch. A third approach is to pattern a binary structure and use a mass transport process to form a continuous profile. GaP is a convenient material to work with because it has a high refractive index and it has been demonstrated that lenses can be etched in it. It may be reasonable to consider other materials for the lens wafers. For example, a lens wafer could be molded in glass. Lenses could be etched in silica or some other glass. Other semiconductor materials like ZnSe or ZnS could be used instead of GaP. Lenses could also be etched in a thick film of material deposited on a substrate made from different material, as shown in FIG. 13. This approach may be. viable when the desired lens material is not available in bulk form. The index difference between the substrate and the film would have to be taken into account in the optical design. The etching processes could utilize wet chemistry or dry chemistry, such as RIE or ion milling. The quarter waveplate could be incorporated as a separate wafer, and bonded into the stack. A head for use with phase-change media could be made by leaving out the coil fabrication steps. Bond pads could be connected to the coil leads using a shadow mask technique across an edge of the head. Additional grooves or features can be added to expose coil leads, bond pads, or through-holes to facilitate the electrical connection of the coil to the top of the slider. Therefore, the scope of the present invention is to be limited only by the following claims.

What is claimed is:

1. An optical head for transferring a light from a source to a storage disk of a storage drive, comprising:
    a first block;
    a reflective element, the reflective element coupled to the first block to direct the light to the disk;
    a second block, the second block coupled to the first block;
    a first lens etched into a first surface of the second block, wherein the first lens is a near-field lens and focuses the light onto the disk; and
    an air bearing surface feature etched into a second surface of the second block.

2. The head of claim 1, wherein the second block comprises GaP.

3. The head of claim 1, wherein a bottom of the first lens of the second block comprises a bottom co-planar with the air bearing surface feature.

4. The head of claim 1, wherein the first block is bonded to the second block.

5. The head of claim 4, wherein the first and second blocks are bonded together by glass fit bonding, or direct wafer fusion bonding, or anodic bonding.

6. The head of claim 1, wherein the second block comprises a magnetic coil below the first lens and in a cavity in the second block.

7. The head of claim 1, further comprising as third block, the third block disposed between the first and second blocks and coupled thereto, and comprising a second lens etched in a surface of the third block and aligned with the first lens.

8. The head of claim 7, wherein the third block is bonded to the second block.

9. The head of claim 8, wherein the second and third block comprise GaP.

10. The head of claim 9, wherein the first lens and the second lens provide a numerical aperture (NA) of at least 1.3.

11. The head of claim 1, wherein the second block comprises a material having a high refractive index and capable of being etched.

12. A storage system comprising:
    a source, the source providing a light;
    a storage disk
    a head;
    a first block;
    a reflective element, the reflective element coupled to the first block to direct the light to the storage disk;
    a second block, the second block coupled to the first block;
    a first lens etched into a first surface of the second block, wherein the first lens is a near-field lens and focuses the light onto the disk; and
    an air bearing etched into a second surface of the second block.

13. The head of claim 12, wherein the second block comprises GaP.

14. The head of claim 12, wherein a bottom of the first lens of the second block comprises a bottom co-planar with the air bearing.

15. The head of claim 12, wherein the first block is bonded to the second block.

16. The head of claim 12, wherein the second block comprises a magnetic coil below the first lens and in a cavity in the second block.

17. The head of claim 12, further comprises a third block, the third block disposed between the first and second blocks and bonded thereto.

18. The head of claim 17, further comprising a second lens, wherein the third block comprises the second lens etched into a surface of the third block.

* * * * *